United States Patent
Zeller et al.

(10) Patent No.: US 12,235,462 B2
(45) Date of Patent: Feb. 25, 2025

(54) OPTICAL ARRANGEMENT AND LASER SYSTEM

(71) Applicant: TRUMPF Laser- und Systemtechnik GmbH, Ditzingen (DE)

(72) Inventors: Thomas Zeller, Sindelfingen (DE); Christoph Tillkorn, Villingendorf (DE); Julian Hellstern, Rottweil (DE); Andreas Heimes, Renningen (DE); Christian Lingel, Kernen im Remstal (DE); Christoph Irion, Stuttgart (DE); Michael Jenne, Ditzingen (DE)

(73) Assignee: TRUMPF LASER-UND SYSTEMTECHNIK GMBH, Ditzingen (DE)

( * ) Notice: Subject to any disclaimer, the term of this patent is extended or adjusted under 35 U.S.C. 154(b) by 273 days.

(21) Appl. No.: 17/956,843

(22) Filed: Sep. 30, 2022

(65) Prior Publication Data

US 2023/0027190 A1  Jan. 26, 2023

Related U.S. Application Data

(63) Continuation of application No. PCT/EP2021/058130, filed on Mar. 29, 2021.

(30) Foreign Application Priority Data

Mar. 30, 2020  (DE) .................... 10 2020 108 648.2

(51) Int. Cl.
*G02B 27/09* (2006.01)

(52) U.S. Cl.
CPC ..... *G02B 27/0916* (2013.01); *G02B 27/0927* (2013.01)

(58) Field of Classification Search
CPC ............ G02B 27/0916; G02B 27/0927; G02B 27/106; G02B 27/126; G02B 27/0938
See application file for complete search history.

(56) References Cited

U.S. PATENT DOCUMENTS

| 5,798,824 A | 8/1998 | Kudo |
| 6,567,219 B1 | 5/2003 | Tanaka |
| (Continued) | | |

FOREIGN PATENT DOCUMENTS

| CN | 110723941 A | 1/2020 |
| CN | 110885215 A | 3/2020 |
| (Continued) | | |

*Primary Examiner* — Joseph P Martinez
(74) *Attorney, Agent, or Firm* — LEYDIG, VOIT & MAYER, LTD.

(57) ABSTRACT

An optical arrangement converts a laser beam into a line-type beam having a line-type beam cross-section that extends along a line direction with a non-vanishing intensity. The arrangement has: reshaping optics having: an input aperture through which the laser beam is radiated in; and an elongate output aperture, the reshaping optics being configured such that the laser beam radiated in is converted into a beam packet with beam segments that emerge through the output aperture; homogenization optics, which contribute to the conversion of the beam packet into the line-type output beam, and by which different beam segments are mixed and superposed along the line direction; and redirection optics configured to redirect the laser beam such that an incidence position/direction of laser beam on the input aperture is changed in dependence on time.

16 Claims, 5 Drawing Sheets

(56) References Cited

U.S. PATENT DOCUMENTS

| | | |
|---|---|---|
| 2004/0042080 A1 | 3/2004 | Caudle et al. |
| 2007/0119745 A1 | 5/2007 | Vogel et al. |
| 2007/0211467 A1 | 9/2007 | Weber et al. |
| 2011/0097906 A1 | 4/2011 | Kwon et al. |
| 2013/0229653 A1* | 9/2013 | Tatsuta .................. G01J 3/10 |
| | | 359/570 |
| 2014/0268265 A1 | 9/2014 | Kim et al. |
| 2016/0103313 A1 | 4/2016 | Kim et al. |
| 2021/0255466 A1* | 8/2021 | Beck .................. G02B 27/145 |

FOREIGN PATENT DOCUMENTS

| | | |
|---|---|---|
| DE | 102004008464 A1 | 9/2005 |
| DE | 102014204960 A1 | 9/2014 |
| DE | 102016006960 A1 | 12/2017 |
| EP | 1988130 A2 | 11/2008 |
| GB | 1261943 A | 1/1972 |
| JP | H08179237 A | 7/1996 |
| JP | 2004252275 A | 9/2004 |
| JP | 2009529155 A | 8/2009 |
| WO | WO 2007100608 A1 | 9/2007 |
| WO | WO 2018019374 A1 | 2/2018 |
| WO | WO 2019243042 A1 | 12/2019 |

\* cited by examiner

OPTICAL ARRANGEMENT AND LASER SYSTEM

CROSS REFERENCE TO RELATED APPLICATIONS

This application is a continuation of International Application No. PCT/EP2021/058130 (WO 2021/198165 A1), filed on Mar. 29, 2021, and claims benefit to German Patent Application No. DE 102020108648.2, filed on Mar. 30, 2020. The aforementioned applications are hereby incorporated by reference herein.

FIELD

The present disclosure relates to an optical arrangement for converting an input laser beam into a line-type output beam, and to a laser system comprising such an optical arrangement.

BACKGROUND

Line-type output beam laser systems serve to generate in particular high-intensity radiation having an intensity distribution that has a beam cross section extending in the manner of a line. The axis defined by the line-type extent will be referred to in the following text as the "long axis" of the intensity distribution. An axis perpendicular to the line-type extent and perpendicular to the propagation direction will also be referred to as the "short axis." For the description of the geometric relationships of the beam, in each case a local coordinate system should be assumed, wherein the long axis (x), the short axis (y), and the propagation direction (z) define an oriented, right-handed Cartesian coordinate system.

The line-type beam profiles mentioned are used for example to process surfaces of glasses or semiconductors (for example tempering, annealing). The line-type beam profile is scanned here substantially perpendicular to the long axis over the surface to be processed. With the radiation, for example recrystallization processes, surface melts, diffusion processes of foreign materials into the material to be treated, or other phase conversions in the region of the surface can be triggered. Such processing processes are used, for example, in the production of thin-film-transistor (TFT) displays, in the doping of semiconductors, in the production of solar cells, but also in the production of esthetically designed glass surfaces for construction purposes.

An optical arrangement for converting an input laser beam into a line-type output beam is described in WO 2018/019374 A1.

It is important for the aforementioned processing processes that the intensity profile along the long axis has a substantially constant intensity profile, which is as homogeneous as possible and that the intensity profile along the short axis satisfies corresponding quality requirements. In practice, however, the intensity profile has regularly local inhomogeneities in the intensity profile that are caused, for example, by interference artifacts (for example regular diffraction patterns), and/or defects and form errors of optical units (for example aberrations), and/or contaminations of optical units due to particles (lead to shadows cast on the working plane).

An optical system for eliminating inhomogeneities in the intensity distribution of laser radiation for processing thin-film layers is disclosed in DE 10 2016 006 960 A1. The optical system comprises a stop device with at least one spatially modifiable stop element and a control unit that is set up to control the spatial modification of the stop element such that the size of locally delimited indentations in the beam profile is increased and reduced multiple times over a predetermined period of time.

WO 2007/100608 A1 discloses laser beam micro-smoothing for laser annealing systems. Micro-smoothing, as it is known, comprises shifting the laser beam in a direction perpendicular to the processing direction in order to smooth out small-scale inhomogeneities in the profile of the laser beam. The shift is achieved here with a pair of mirrors or alternatively with rotating wedge plates, which are arranged in the beam path of the laser beam downstream of the homogenization optical unit.

DE 10 2014 204 960 A1 and US 2014/0268265 A1, which have the same priority, disclose an optical module for inclining a laser beam in order to distribute the amount of light more evenly. The module includes a mirror, an actuator, and a deformation element having a multiplicity of articulations. The mirror can be shifted with the aid of the actuator and the deformation element.

US 2011/0097906 A1 discloses a vibration apparatus for vibrating a line-type laser beam with the aid of a mirror, which is arranged in the beam path downstream of a homogenization optical unit. A further laser vibration apparatus with a moving mirror is disclosed in US 2016/0103313 A1.

SUMMARY

In an embodiment, the present disclosure provides an optical arrangement that converts at least one input laser beam into a line-type output beam, which propagates along a propagation direction and which has, in a working plane, a line-type beam cross-section that extends along a line direction with a non-vanishing intensity. The optical arrangement has a reshaping optical unit having: an input aperture through which the at least one input laser beam is capable of being radiated in; and an elongate output aperture. The reshaping optical unit is configured such that the input laser beam radiated in through the input aperture is converted into a beam packet having a multiplicity of beam segments that emerge through the output aperture. The arrangement also has a homogenization optical unit, which contributes to the conversion of the beam packet into the line-type output beam, and by which different beam segments, of the multiplicity of beam segments of the beam packet, are mixed and superposed along the line direction. The arrangement further includes a redirection optical unit, which is configured to redirect the at least one input laser beam in such a way that an incidence position or an incidence direction of the at least one input laser beam on the input aperture of the reshaping optical unit is changed in dependence on time.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Against the above background, aspects of the present disclosure specify an alternative optical arrangement that enables an intensity profile of line-type laser illumination on a working surface to be as homogeneous as possible.

For example, according to one aspect, this is achieved by providing an optical arrangement having a redirection optical unit that is configured to redirect the at least one input laser beam in such a way that an incidence position and/or an incidence direction of the at least one input laser beam on the input aperture of the reshaping optical unit is changed in dependence on time.

The optical arrangement is an apparatus for converting an input laser beam into an output beam having a line-type intensity profile. In this respect, the output beam propagates (averaged over space) in a propagation direction and has an intensity distribution that has, in an optical working plane of the optical arrangement, a beam cross section with a line-type profile along a direction that is designated "line direction" in the present context. Since the beam can be redirected once or multiple times, depending on the configuration, as it passes through the optical arrangement, the line direction should be understood to mean that the beam cross section is elongated locally along the line direction.

The optical arrangement comprises a reshaping optical unit with an input aperture, through which the input laser beam is able to be radiated, and an elongate output aperture. The output aperture defines an output aperture longitudinal direction. The dimension of the output aperture along the output aperture longitudinal direction is in particular significantly greater than the dimension perpendicular to the output aperture longitudinal direction.

The reshaping optical unit is configured such that the input laser beam radiated in through the input aperture is converted into a beam packet that exits through the output aperture. Advantageously, the beam packet already forms an elongate intensity distribution in a viewing plane downstream of the output aperture, in particular with a substantially line-type character. The beam packet comprises a multiplicity of beam segments, which can be distributed in particular over the elongate output aperture and preferably fill the output aperture completely.

In the present context, a beam packet designates in particular a light distribution that can be mathematically described by a vector field, wherein each spatial point is locally assigned the Poynting vector of the associated electromagnetic field.

The reshaping optical unit is preferably configured to generate from a largely coherent input laser beam a beam packet which has reduced spatial coherence or is preferably substantially incoherent.

The optical arrangement also comprises a homogenization optical unit, which is configured to convert the beam packet into a laser line with the desired homogeneity (in particular along the local line direction). The homogenization optical unit is configured in such a way that different beam segments of the beam packet are mixed and superposed along the line direction so that the intensity profile is homogenized with respect to that direction in which the beam cross section extends longitudinally.

In the beam path upstream of the reshaping optical unit, the optical arrangement further comprises a redirection optical unit, which is configured to redirect the input laser beam in such a way that an incidence position and/or an incidence direction of the input laser beam on the input aperture of the reshaping optical unit is changed in dependence on time.

A change in the incidence position of the input laser beam on the input aperture of the reshaping optical unit advantageously leads to a spatial shift of the beam centroid of the beam packet emerging through the output aperture (beam centroid in the present context refers in particular to the centroid of the intensity distribution over the beam cross section of the intermediate beam packet). As a result, the beam packet is incident on the homogenization optical unit at a changed position, which follows the reshaping optical unit in the beam path. Such a spatial shift of the beam packet leads to a change in the angle distribution of the beam components of the output beam. In other words, a propagation direction of the output beam is changed by changing the spatial position of the beam centroid of the beam packet.

By changing the incidence position of the input laser beam at the reshaping optical unit in dependence on time, optical elements that are connected downstream of the reshaping optical unit in the beam path (e.g. telescopic lenses, redirecting mirrors, focusing lenses) can therefore be illuminated from different directions in dependence on time. Contaminants in the beam path downstream of the optical arrangement (e.g. particulate contaminants on the subsequent optical elements) are consequently likewise illuminated from different directions in dependence on time so that a shadow cast by these contaminants is changed in dependence on time and is thus smoothed on average. Inhomogeneities in the intensity profile which are due to shadows can be reduced in this way. In addition, inhomogeneities that result from errors in the shape of optical units can be reduced.

A change in the incidence direction of the input laser beam on the input aperture of the reshaping optical unit leads in particular to a change in the angle distribution of the beam packet emerging through the output aperture. In this respect, an emission direction of the beam packet from the output aperture can be changed by changing the incidence direction of the input laser beam. In addition, the intensity distribution of the beam packet at the output aperture of the reshaping optical unit is qualitatively changed. As a result, the beam packet is not only incident on the homogenization optical unit at a changed position (which, as explained above, leads to a change in the propagation direction of the output beam), but also at a changed angle. As a result, the beam centroid of the output beam is additionally shifted spatially. In other words, the beam centroid of the output beam can be shifted spatially in dependence on time by changing the incidence direction of the input laser beam at the reshaping optical unit in dependence on time. In this way, interference effects can be smoothed out on average, which has a positive effect on the homogeneity of the intensity profile.

It is advantageous here that the temporal variation already occurs upstream of the reshaping optical unit and thus comparatively early on in the beam path of the laser beam, because the variation can be generated in this way with relatively small and relatively lightweight optical elements. After the reshaping optical unit, the laser beam is already widened in a line-type manner, and for this reason the optical elements in the further beam path are dimensioned accordingly, at least in the line axis. With the new arrangement, mechanical vibrations in the laser system can be minimized more easily and cost-effectively. In addition, the adjustment of the redirection optical unit in the front part of the beam path and in particular upstream of the reshaping optical unit is simpler and more robust with regard to tolerances.

The optical arrangement according to aspects of the present disclosure, therefore, enables local inhomogeneities in the intensity distribution to be smoothed averaged over time in a simple and efficient manner and makes it possible to achieve an improved process result in the surface treatment of workpieces.

In order to achieve a homogeneous intensity profile averaged over time, it is preferred if the redirection optical unit is configured to change the incidence position and/or the incidence direction of the input laser beam on the input aperture in a recurring movement pattern. The time scales of the change in comparison with the process times of the application field of the optical arrangement are preferably so short that effectively a spatially homogeneous intensity is effective along the line direction. Recurring means in particular that an initial configuration is assumed or passed through again and again. In principle, this can be done periodically or non-periodically. For example, it is conceivable that the incidence position is moved back and forth around a reference position. A recurring movement preferably does not take place periodically at a fixed frequency, but rather with a varying, in particular randomly varying, frequency and/or amplitude, in particular chaotically. Dominant frequency contributions preferably lie in a range from 50-150 Hz, in particular in a range from 75-125 Hz (in the present context this means in particular that the Fourier spectrum of the recurring movement pattern has a comparatively high amplitude at the dominant frequency contributions).

Furthermore, it is preferred if the redirection optical unit is configured to change the incidence position of the input laser beam on the input aperture along an input aperture longitudinal direction, wherein the input aperture longitudinal direction is understood to mean the longitudinal direction of the preferably longitudinally extending input aperture. Such a variation is comparatively simple and robust with regard to the adjustment of the optical elements. A spatial shift of the beam centroid of the beam packet emerging from the output aperture then takes place along the longitudinal direction of the longitudinally extending output aperture (output aperture longitudinal direction). The redirection optical unit is preferably configured to shift the incidence position of the input laser beam on the input aperture back and forth along the input aperture longitudinal direction around a reference position. A back-and-forth movement preferably takes place at a varying, in particular randomly varying, frequency, wherein dominant frequency contributions in this case lie in particular in a range from 50-150 Hz, more particularly in a range from 75-125 Hz.

Preferably, the redirection optical unit is additionally or alternatively also configured to change the incidence direction of the input laser beam relative to the input aperture in such a way that a plane containing the incidence direction and an input aperture longitudinal direction is pivoted about the input aperture longitudinal direction, in particular pivoted back and forth. Such a tilting of the input laser beam relative to the input aperture leads to a tilting of the beam packet about an axis perpendicular to the output aperture longitudinal direction and perpendicular to the propagation direction. This configuration is advantageous with regard to the exact adjustment of the further optical elements in the subsequent beam path. A back-and-forth movement preferably takes place with a varying, in particular randomly varying, frequency. Here, the dominant frequency contributions are in particular in a range of 50-150 Hz, more particularly in a range of 75-125 Hz.

In order to change the incidence position and/or the incidence direction of the input laser beam on the input aperture, the redirection optical unit can comprise at least one mirror device connected upstream of the reshaping optical unit in the beam path. The mirror device can have at least one mirror that is capable of being shifted and/or tilted by a motor. In some exemplary embodiments, the mirror device comprises two mirrors that are capable of being shifted and/or tilted relative to one another. By shifting and/or tilting the at least one mirror, a position of the beam centroid of the input laser beam and/or a propagation direction of the input laser beam can be changed in a simple and robust manner. The mirror device can in particular be arranged in the beam path in such a way that shifting and/or tilting the at least one mirror leads to a change in the incidence position and/or the incidence direction of the input laser beam on the input aperture of the reshaping optical unit.

In a further preferred configuration, the redirection optical unit comprises a lens system with at least one first lens and at least one second lens, which is capable of being tilted relative to the at least one first lens and/or is capable of being shifted laterally with respect to the optical axis. In some particularly preferred exemplary embodiments, the first and second lenses can form a telescope arrangement which, when the second lens is in a rest position, is inserted neutrally into the beam path and thus exerts virtually no or a negligible influence on the beam shaping of the laser beam. In other words, in some advantageous exemplary embodiments, the at least one first lens and the at least one second lens form a lens telescope that only noticeably influences the beam path of the laser beam when the at least one second lens is moved out of its rest position relative to the at least one first lens. These exemplary embodiments make it possible in a simple manner to selectively activate or not the micro-smoothing of the beam profile in the region of the working plane, without the laser line changing as such in the region of the working plane. In addition, such a lens system can easily be retrofitted to older laser systems or those already in operation.

In a further configuration, the redirection optical unit comprises an optical element that is rotatably mounted. In some exemplary embodiments, the rotatable optical element can be a birefringent optical element. A rotating optical element in the beam path upstream of the reshaping optical unit can advantageously aid in minimizing unwanted vibrations in the laser system. The rotational movement can be implemented with lower load changes than, for example, an oscillating translational movement.

In a further configuration, the redirection optical unit is arranged on a first foundation and the reshaping optical unit is arranged on a second foundation, with the first foundation and the second foundation being arranged separately from each other. In some exemplary embodiments, the first and the second foundation can each include a granite plate, wherein the respective granite plates are arranged separately from one another and in particular without contact with one another. Alternatively or additionally, the first and the second foundation can each include a cast plate, for example made of metal and/or concrete, and/or a steel foundation. The separate foundations have the advantage that vibrations that can occur as a result of the variation in the redirection optical unit are better decoupled from the subsequent elements in the beam path of the laser beam.

In a further advantageous configuration, the optical arrangement further comprises at least one transformation lens means connected downstream of the homogenization optical unit in the beam path. The transformation lens means is configured in particular to superpose the beam segments that have been mixed by the homogenization optical unit and to further focus them to form the line-type output beam. In this respect, the transformation lens means in particular also contributes to the homogenization. For this purpose, for example, the working plane can extend in a focus region of the transformation lens means. It is conceivable, for example, that, from each region of the captured radiation, beam segments are focused into different, preferably all, regions along the line direction.

An advantageous configuration of the transformation lens means is in the form of a Fourier lens (in particular one not having an imaging effect), in particular as a Fresnel zone plate.

The properties of the output beam are crucially influenced by the design of the reshaping optical unit. In particular, a configuration of the reshaping optical unit influences how a light distribution of the output beam changes when the incidence position and/or the incidence direction of the input laser beam change(s). The optical processes in the reshaping optical unit are complex and in particular also have an influence on the spatial coherence of the light distribution, which in turn is crucial for whether disruptive interference artifacts form. A change in the radiation in the beam path upstream of the reshaping optical unit therefore usually has a particularly large influence on the radiation properties in the further beam path.

In order to achieve a line-type beam cross-section of the output beam, it is preferred if the input aperture of the reshaping optical unit is elongate and extends longitudinally along an input aperture longitudinal direction, and if the output aperture extends along an output aperture longitudinal direction.

In this case, the reshaping optical unit is preferably configured in such a way that the beam packet emerging through the output aperture has a multiplicity of beam segments which are arranged next to one another along the output aperture longitudinal direction. Since the input aperture is elongate, the input laser beam can already have an elongate beam cross section, which promotes the conversion of the input laser beam into an output beam having a line-type beam cross section. For example, it is conceivable that a pre-shaping optical unit is provided, which reshapes the input laser beam before it reaches the reshaping optical unit in such a way that it has an elliptical beam cross section.

An advantageous configuration of the reshaping optical unit further consists of a distance between adjacent beam segments of the beam packet emerging from the output aperture being greater than an extension of the beam segments in a direction perpendicular to the output aperture longitudinal direction and perpendicular to the (local) propagation direction. In the case of a reshaping optical system that is configured in this way, a comparatively small shift of the incidence position along the input aperture longitudinal direction leads to a comparatively large shift of the beam centroid of the beam packet along the output aperture longitudinal direction. In this respect, the input laser beam only needs to be redirected slightly (e.g. by a mirror device, see above) in order to achieve a comparatively large shift in the beam centroid of the beam packet.

Preferably, the reshaping optical unit is further configured to generate a beam packet that emerges from the output aperture and has reduced spatial coherence, preferably has significantly reduced spatial coherence, or is incoherent, when a coherent input laser beam is radiated in through the input aperture (i.e. an input laser beam that has spatial coherence over the entire extent of the input aperture) or when an at least partially coherent input laser beam is radiated in. In this way, interference effects in the case of the homogenization and/or focusing that follows in the beam path are reduced or entirely avoided, as a result of which inhomogeneities in the intensity profile can be further reduced.

The described reduction or elimination of the spatial coherence can be achieved in particular by the reshaping optical unit being configured in such a way that different optical path lengths are provided for adjacent beam segments in an input laser beam when passing through the reshaping optical unit. In particular, the reshaping optical unit is configured in such a way that adjacent beam segments in an input laser beam are rearranged when passing through the reshaping optical unit in such a way that the beam segments of the emerging beam packet, which emerge through the output aperture, have traveled along different optical path lengths, and so the beam packet has reduced spatial coherence, in particular is incoherent. In particular, the reshaping optical unit is configured in such a way that the optical path lengths for beam segments that enter at opposite and marginal regions of the input aperture differ by a value that is greater than the coherence length of the input laser beam.

The reshaping optical unit is preferably plate-like and formed in one piece from a material that is optically transmissive or transparent to the wavelength of the input laser beam. In this case, the reshaping optical unit has a plate front side and a plate rear side running substantially parallel to the plate front side. In this respect, the plate front side and plate rear side form the large boundary surfaces of a plate that extends two-dimensionally. In particular, a region of the plate front side provides the input aperture and a region of the plate rear side provides the output aperture. The reshaping optical unit is advantageously configured in such a way that beam segments of an input laser beam, after being coupled in through the input aperture, are guided to the output aperture by at least one reflection, preferably multiple reflections, on the plate front side and the plate rear side. The number of reflections depends in particular on the incidence position and the incidence angle on the input aperture. In this respect, different beam segments of the input laser beam travel along different optical path lengths. In particular, the reflection takes place in such a way that different (in particular adjacent) beam segments of the input laser beam are rearranged when passing through the reshaping optical unit and emerge through the output aperture as output beam segments.

The homogenization optical unit preferably acts in such a way that different beam segments of the beam packet emerging from the reshaping optical unit are mixed and/or superposed on one another. For this purpose, the homogenization optical unit can, for example, comprise at least one lens array, wherein the at least one lens array can have a multiplicity of cylindrical lenses extending along respective cylinder axes. In particular, the cylindrical lenses are geometrically dimensioned in such a way that the beam packet passes through a multiplicity of cylindrical lenses lying next to one another.

According to another aspect, an alternative optical arrangement that enables an intensity profile of line-type laser illumination on a working surface to be as homogeneous as possible is also achieved by a laser system which is configured to produce a line-type output laser beam having an intensity distribution that has a line-type intensity profile in the beam cross section.

The laser system comprises at least one laser light source for emitting an input laser beam and an optical arrangement of the type described above for converting the input laser beam into the line-type output beam. The optical arrangement is arranged such that the input laser beam is supplied by the laser light source.

The laser light source is suitable or configured in particular for multi-mode operation. The laser radiation of the laser light source can in principle be radiated directly into the optical arrangement. However, it is also conceivable that the laser system furthermore comprises a pre-shaping optical unit, by means of which the laser radiation is reshaped before it enters the optical arrangement. The pre-shaping optical unit can be configured as a collimating optical unit, for example. For example, the pre-shaping optical unit can have an anamorphic effect, with the result that the input laser beam has an elliptical beam cross section.

In the following description and the figures, the same reference signs are used in each case for identical or corresponding features.

Figure 1:
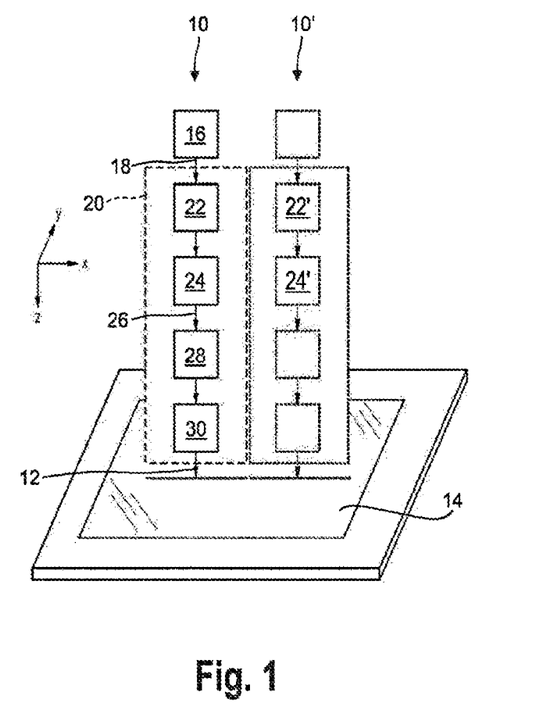
FIG. 1 shows a diagram for illustrating the beam path in a laser system to produce line-type intensity distributions.

FIG. 1 shows, in an illustrated diagram, a laser system 10 for producing an output beam 12, which has in a working plane 14 a line-type beam cross section which has a non-vanishing intensity and is extended along a line direction (x-direction).

The laser system 10 comprises at least one laser light source 16 for outputting laser radiation. The laser light source 16 is preferably configured as a multi-mode laser. The laser radiation supplies an input laser beam 18, optionally via a pre-shaping optical unit. The pre-shaping optical unit can have, for example, a collimating effect and/or reshape the laser radiation into an input laser beam 18 having an elliptical beam cross section. It is conceivable, for example, that the laser radiation is initially reshaped into the input laser beam 18 by means of redirection mirrors and/or lens means.

The laser system 10 furthermore comprises an optical arrangement 20, by means of which the input laser beam 18 is converted into the line-type output beam 12.

A Cartesian coordinate system (x, y, z) is shown in the figures to explain the local geometric conditions of the beam. In the example illustrated, the input laser beam 18 propagates along the z-direction. The axis defined by the line-type extent of the output beam 12 runs along the x-axis ("long axis"). An axis perpendicular to the (local) line direction and perpendicular to the propagation direction is called the "short axis" (y-axis).

It may be desirable for processing large areas to attain a very elongated, line-type intensity profile. In this respect, it is conceivable to provide a plurality of laser systems of the type mentioned (10, 10') next to one another and to arrange them such that the intensity distributions complement one another to form an elongate line.

The optical arrangement 20 comprises here a plurality of optical assemblies which are successively arranged in the beam path. As shown in simplified form in FIG. 1, the input laser beam 18 first passes through a redirection optical unit (redirection optics) 22 and is then guided through a reshaping optical unit (reshaping optics) 24 which converts the input laser beam 18 into a beam packet 26. The beam packet 26 is then homogenized by means of a homogenization optical unit 28 and is converted, in interaction with a transformation lens means 30 downstream of the homogenization optical unit 28, into the line-type output beam 12, which has a largely homogeneous intensity along the line direction.

Optionally, the optical arrangement can additionally comprise a collimating/focusing optical unit (collimating/focusing optics) connected downstream of the transformation lens means 30 in the beam path. In some preferred exemplary embodiments, the laser systems of the type mentioned 10, 10' arranged next to one another can each have their own redirection optical unit (redirection optics) 22, 22' and their own reshaping optical unit (reshaping optics) 24, 24' and can share the downstream homogenization optical unit (downstream homogenization optics) 28 and/or the downstream transformation lens means 30. In other words, in some exemplary embodiments, the homogenization optical unit 28 and/or the transformation lens means 30 can be illuminated by a plurality of adjacent beam packets 26, 26'.

Figure 2:
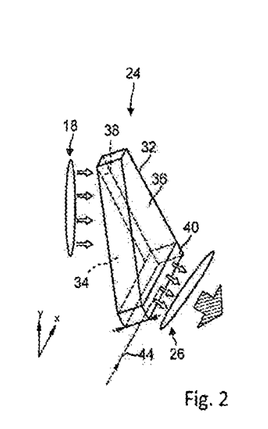
FIG. 2 shows an illustrated diagram of a preferred reshaping optical unit.
Figure 3:
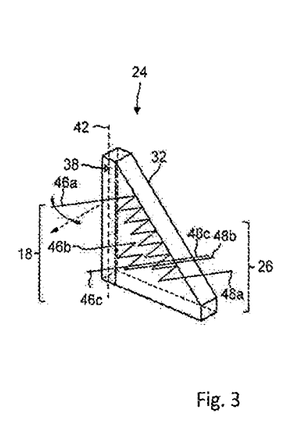
FIG. 3 shows an illustrated diagram to explain the beam path in the preferred reshaping optical unit.

FIGS. 2 and 3 show the reshaping optical unit (reshaping optics) 24 in a possible embodiment in an illustrated diagram. In the example shown, the reshaping optical unit 24 is formed in one-piece as a plate-type reshaping body 32 made of a material that is transparent to the laser radiation.

The reshaping body 32 has a plate front side 34 and a plate rear side 36 extending parallel thereto. A region of the plate front side 34 serves as a light coupling-in surface and provides an input aperture 38 of the reshaping optical unit 24 through which the input laser beam 18 can be coupled into the reshaping body 32. A region of the plate rear side 36 acts as a light coupling-out surface and provides an output aperture 40 through which the beam packet 26 emerges.

As can be seen from FIG. 3, the input aperture 38 has an elongate design and extends along an input aperture longitudinal direction 42. The output aperture 40 likewise has an elongate design and extends along an output aperture longitudinal direction 44 (cf. FIG. 2).

The reshaping optical unit 24 acts in particular in such a way that adjacent beam segments 46a, 46b, 46c of the input laser beam 18, when passing through the reshaping optical unit 24, are rearranged into beam segments 48a, 48b, 48c of the beam packet 26 which are arranged next to one another along the output aperture longitudinal direction (44) (cf. FIG. 3). In the example shown, this is due to the fact that the beam segments 46a, 46b, 46c coupled in through the input aperture 38 are guided to the output aperture 40 by total internal reflection in the reshaping body 32 between the plate front side 34 and the plate rear side 36. Since the beam segments 46a, 46b, 46c are coupled in through the input aperture 38 at different positions, the beam segments 48a, 48b, 48c of the beam packet 26 emerging from the output aperture 40 have traveled along different optical path lengths. The reshaping body 32 is in particular configured in such a way that the optical paths of the various beam segments 48a, 48b, 48c are so different from one another that the beam packet 26 has a greatly reduced spatial coherence, in particular is incoherent. This is due in particular to the fact that the differences in the optical path lengths for the beam segments 48a, 48b, 48c are large compared with the coherence length of the laser radiation.

Figure 4:
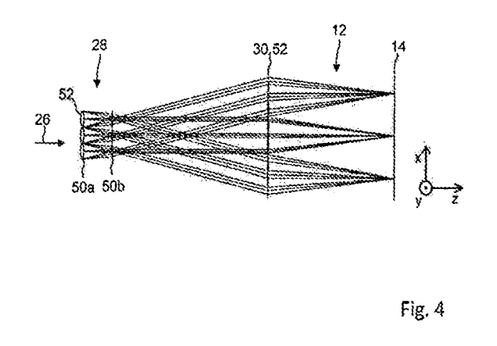
FIG. 4 shows an illustrated diagram to explain the effect of the homogenization optical unit and of the transformation lens means.

FIG. 4 shows schematically how the homogenization optical unit (homogenization optics) 28 and the transformation lens means 30 work. In principle, the homogenization optical unit 28 is arranged in such a way that it captures the beam packet 26 and mixes and superposes different beam segments 48a, 48b, 48c of the beam packet 26. For example, the homogenization optical unit 28 can have two lens arrays 50a, 50b which are connected one after the other in the beam path and which act on the beam segments 48a, 48b, 48c and mix and superpose them. As shown by way of example in FIG. 4, the lens arrays 50a, 50b have a multiplicity of cylindrical lenses 52 extending along respective cylinder axes. The cylindrical lenses 52 are geometrically dimensioned in such a way here that the beam packet 26 passes through a multiplicity of cylindrical lenses 52 lying next to one another.

The transformation lens means 30 connected downstream of the homogenization optical unit 28 in the beam path is configured in particular to superpose the mixed beam segments 48a, 48b, 48c to form the line-type output beam 12, so that the desired line-type intensity distribution in the working plane 14 is realized. By way of example and with preference, the transformation lens means 30 is formed by a non-imaging Fourier lens 54. The Fourier lens 54 is arranged in particular such that the working plane 14 extends in a focus plane of the Fourier lens 54 (see FIG. 4).

In particular in conjunction with the reshaping optical unit 24, which, as explained above, preferably largely eliminates the coherence of the input laser beam 18, the mixing and superposition of the beam segments 48a, 48b, 48c of the beam packet 26 results in the output beam 12 already being comparatively homogeneous along the (local) line direction x. Nevertheless, local inhomogeneities in the intensity profile can occur, in particular due to interference effects and/or shape errors of optical units, and/or contamination of optical units (see above).

As explained in detail below, the inhomogeneities can be smoothed on average by changing the incidence position and/or the incidence direction 68, 68' of the input laser beam 18 on the input aperture 38 of the reshaping optical unit 24 in dependence on time. For this purpose, the redirection optical unit 22 is configured to change an incidence position and/or an incidence direction 68, 68' of the input laser beam 18 on the input aperture 38 of the reshaping optical unit 24 in dependence on time.

Figure 5:
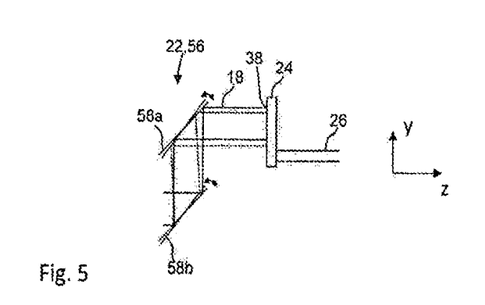
FIG. 5 shows an illustrated diagram to explain a first configuration of the redirection optical unit.

A first configuration of the redirection optical unit (reshaping optics) 22 is shown in FIG. 5. The redirection optical unit comprises a mirror device 56, which has two mirrors 58a, 58b that are tiltable relative to one another. The mirror device 56 is arranged in the beam path of the input laser beam 18 in such a way that an incidence position of the input laser beam 18 on the input aperture 38 of the reshaping optical unit 24 can be changed by tilting the mirrors 58a, 58b relative to one another (indicated by dashed lines in FIG. 5). In particular, the mirror device 56 is aligned in such a way that tilting the mirrors 58a, 58b relative to one another leads to a shift in the incidence position along the input aperture longitudinal direction 42 (along the local y-axis in FIG. 5).

Figure 6:
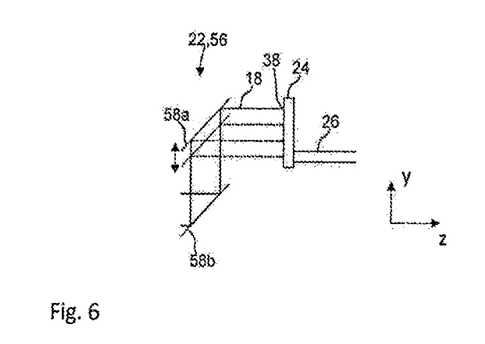
FIG. 6 shows an illustrated diagram to explain a second configuration of the redirection optical unit.

FIG. 6 shows a second configuration of the redirection optical unit (redirection optics) 22, wherein the mirror device 56 has two mirrors 58a, 58b that are shiftable relative to one another. As indicated by dashed lines in FIG. 6, shifting the mirrors 58a, 58b relative to one another likewise leads to a change in the incidence position of the input laser beam 18 along the input aperture longitudinal direction 42 (along the local y-axis in FIG. 5).

A change in the incidence position of the input laser beam 18 along the input aperture longitudinal direction 42 changes the optical path which the individual beam segments 46a, 46b, 46c travel within the reshaping body 32 in such a way that the beam centroid of the beam packet 26 at the output aperture 40 shifts along the output aperture longitudinal direction 44 (orthogonal to the plane of the drawing in FIGS. 5 and 6).

Figure 7:
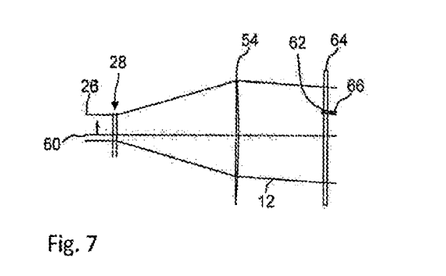
FIG. 7 shows a diagram to explain the beam path at the homogenization optical unit and at the transformation lens means when the incidence position of the input laser beam on the reshaping optical unit changes.

As a result, the beam packet 26 is incident on the homogenization optical unit 28, which is located downstream of the reshaping optical unit 24 in the beam path, at a changed position and thus also at a changed position on the Fourier lens 54 (shown diagrammatically in FIG. 7 by way of example for a shift of the beam packet 26 "upwards" from a central reference position 60). Such a shift of the beam packet 26 means that specific regions of the Fourier lens 52 (the lower region in the example according to FIG. 7) receive fewer intensity contributions from the beam packet 26, as a result of which the light distribution of the output beam 12 has a preferred angle ("downwards" in the example according to FIG. 7).

By moving the incidence position back and forth, an angle distribution of the output beam 12 can be changed in dependence on time so that contaminants 62 (e.g. dust particles) in the beam path downstream of the Fourier lens 54 (e.g. on a subsequent optical unit 64) are illuminated from different directions in dependence on time. A shadow cast 66 produced by such a contaminant 62 is consequently changed over time, so that on average an influence of the shadow cast on the intensity profile can be smoothed out.

The redirection optical unit (redirection optics) 22 can also be configured to change in dependence on time, in addition or as an alternative to changing the incidence position, an incidence direction (indicated in FIG. 8 by arrows denoted by reference signs 68, 68') of the input laser beam 18 on the input aperture 38 of the reshaping optical unit 24. In particular, the redirection optical unit is configured here to change the incidence direction 68, 68' of the input laser beam 18 in such a way that a plane containing the incidence direction 68, 68' and an input aperture longitudinal direction 42 (orthogonal to the plane of the drawing in FIG. 8) is pivoted back and forth around the input aperture longitudinal direction 42 (cf. FIG. 8). For this purpose, the redirection optical unit 22 can comprise, for example, corresponding mirror devices, lenses, and/or other optical elements.

Figure 8:
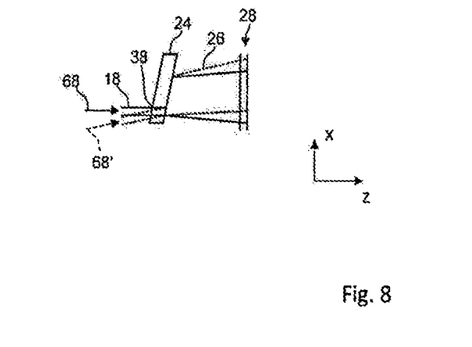
FIG. 8 shows a diagram to explain the beam path in the reshaping optical unit when the incidence direction of the input laser beam on the input aperture changes.
Figure 9:
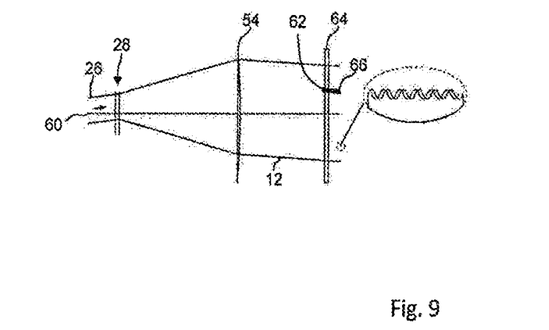
FIG. 9 shows a diagram to explain the beam path at the homogenization optical unit and at the transformation lens means when the incidence direction of the input laser beam on the reshaping optical unit changes.

A change in the incidence direction 68, 68' of the input laser beam 18 leads to an advantageous change in the optical paths of the beam segments 46a, 46b, 46c within the reshaping body 32, in this case in particular such that an angle distribution of the beam packet 26 emerging from the output aperture 40 is changed, i.e. an emission direction of the beam packet from the output aperture 40 is tilted (shown schematically in FIG. 8). Furthermore, the light intensity distribution of the beam packet 26 is also changed qualitatively. The consequence of this is that the beam packet 26 is incident not only at a changed position on the homogenization optical unit 28 and the Fourier lens 54 (cf. the effect described above), but also at a changed angle. Such an angle change leads, among other things, to a spatial shift of the beam centroid of the output beam 12. In this respect, by moving the incidence direction 68, 68' back and forth on the input aperture 38 of the reshaping optical unit 24, the beam centroid of the output beam 12 can be spatially shifted back and forth. In this way, inhomogeneities due to interference effects can be smoothed out on average (indicated schematically in FIG. 9).

Figure 10:
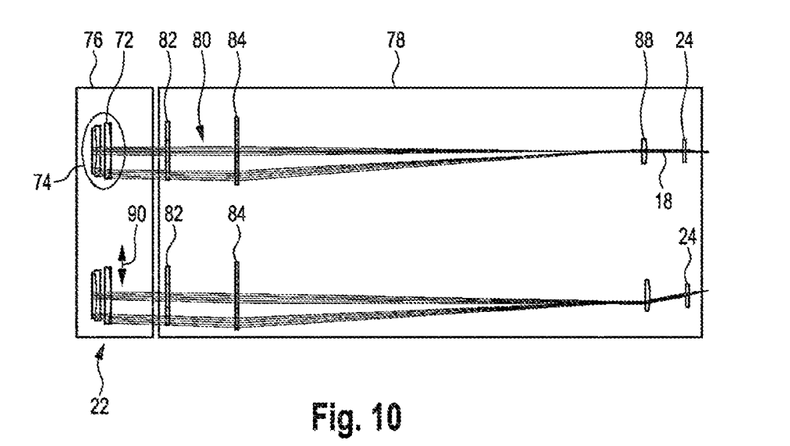
FIG. 10 shows an illustrated diagram to explain a third configuration of the redirection optical unit.

FIG. 10 shows a third exemplary embodiment for the redirection optical unit (redirection optics) 22 in a simplified and schematic illustration. In this exemplary embodiment, the redirection optical unit has a first lens element 70 and a second lens element 72, which together form a lens telescope 74 here. In some preferred variants, the lens telescope 74 is arranged on its own foundation 76, which is spatially separated from the further foundation 78 and is therefore mechanically decoupled. The further foundation 78 here carries a further telescope 80 with two further lens elements 82, 84 and, following in the beam path, a further lens 88 and also the reshaping optical unit 24. The further lens 88 can be omitted in some variants of this exemplary embodiment. The telescope 80 and the further lens 88 are used here to direct the input laser beam optimally in terms of the desired laser line of the output beam 12 onto the input aperture of the reshaping optical unit 24. In this exemplary embodiment, there is also the lens telescope 74 in which the second lens element 72 is movable relative to the first lens element 70. In an advantageous variant, the second lens element 72 can be shifted laterally relative to the first lens element 70, as illustrated by the arrow 90 in the lower part of FIG. 10.

In the upper part of FIG. 10, the second lens element 72 is shown in a neutral rest position. In this neutral rest position, the lens telescope 74 is neutral in the beam path of the optical arrangement 20, i.e. the lens telescope 74 practically does not influence the position and direction at which the input laser beam 18 is incident on the input aperture of the reshaping optical unit 24. In other words, the lens telescope 74 could be omitted in the neutral rest position without the position and incidence direction of the input laser beam 18 on the input aperture of the reshaping optical unit 24 changing significantly. As shown here, the input laser beam 18 is incident on the input aperture of the reshaping optical unit 24 at a defined first position and with a defined first beam direction.

In the lower part of FIG. 10, on the other hand, the second lens element 72 is shifted laterally relative to the first lens element 70, i.e. transversely to the beam direction. As a result, the beam direction with which the input laser beam 18 is incident on the input aperture of the reshaping optical unit 24 changes here. The telescope 80 advantageously reduces the beam entry into the reshaping optical unit 24 along the deflection direction. This increases the deflection angle. By moving the second lens element 72 back and forth relative to the first lens element 70, the beam direction onto the input aperture of the reshaping optical unit 24 can be varied. In some exemplary embodiments, the second lens element 72 can be moved relative to the first lens element 70 with the aid of one or more plunger coils and/or with the aid of one or more piezo actuators.

Figure 11:
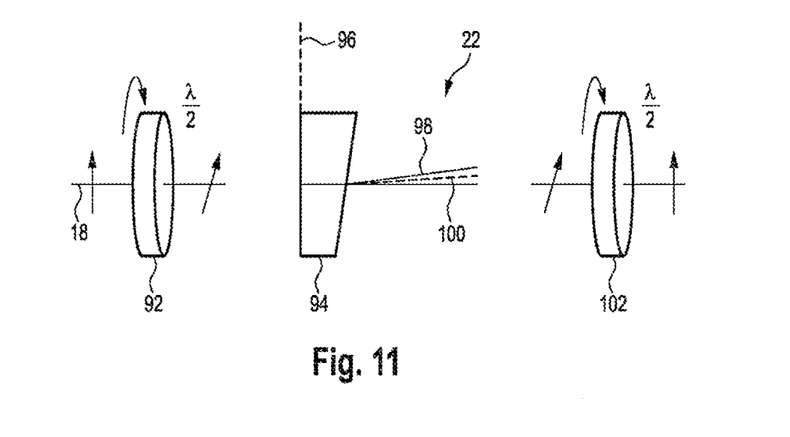
FIG. 11 shows an illustrated diagram to explain a fourth configuration of the redirection optical unit.

FIG. 11 shows a further exemplary embodiment of the redirection optical unit 22 in a simplified and schematic illustration. In this exemplary embodiment, the redirection optical unit 22 comprises an optical element 92, which is arranged rotatably in the beam path upstream of the reshaping optical unit 24. In the illustrated exemplary embodiment, the optical element 92 is a waveplate that brings about a rotation of the polarization of the input laser beam 18. The input laser beam 18 can be linearly polarized, for example, as shown here schematically with a vertical arrow. The wave plate can, in some embodiments, be a $\lambda/2$ plate. The optical element 92 changes the direction of polarization of the input laser beam 18, as indicated by a second arrow drawn obliquely. The input laser beam 18 with the changed direction of polarization is then incident on a further optical element 94 in the form of a birefringent element with an optical axis 96. The polarization rotated with respect to the optical axis 96 is incident on the birefringent element 94. Because of the birefringence, the beam is split into an ordinary partial beam 98 and an extraordinary partial beam 100. The partial beams 98, 100 have beam directions that differ from one another. The energy components in the partial beams 98, 100 depend on the respective polarization of the laser beam emerging from the optical element 92 and thus on the respective rotational position of the optical element 92. As a result, by rotating the optical element 92, the beam direction with which the input laser beam is incident on the reshaping optical unit 24 can be varied.

In an optional and advantageous variant of this exemplary embodiment, a second rotatable wave plate 102 can be arranged in the beam direction downstream of the birefringent element 94 in order to convert the polarization of the laser beam that is incident on the reshaping optical unit 24 back into the input-side state.

In further exemplary embodiments, a rotating prism and/or a rotating mirror can be used in order to illuminate the reshaping optical unit 24 with the input laser beam 18 variably in a time-dependent manner. Furthermore, the redirection optical unit 22 can include an anamorphic telescope. The latter transforms the input laser beam 18 into a highly elliptical beam. Due to beam parameter conservation, the width of the angular spectrum $\theta$ increases with a decreasing width w, and vice versa:

$$\theta_x w_x = \frac{\lambda}{\pi} M_x^2 \text{ and } \theta_y w_y = \frac{\lambda}{\pi} M_y^2.$$

The beam redirection thus substantially affects one of the directional components, while the other directional component can remain largely unaffected. For example, it is advantageous if $\delta\theta/\theta_x \sim 1$ or $>1$, while $\delta\theta/\theta_y \ll 1$ when the laser beam is to generate line-shaped laser illumination on a working surface, in which the laser line runs in the x-direction.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An optical arrangement for converting at least one input laser beam into a line-type output beam, which propagates along a propagation direction and which has, in a working plane, a line-type beam cross-section that extends along a line direction with a non-vanishing intensity, the optical arrangement comprising:
   a reshaping optical unit having an input aperture through which the at least one input laser beam is capable of being radiated in, and an elongate output aperture, wherein the reshaping optical unit is configured such that the input laser beam radiated in through the input aperture is converted into a beam packet having a multiplicity of beam segments that emerge through the output aperture, wherein adjacent beam segments of the input laser beam, when passing through the reshaping optical unit, are rearranged into the multiplicity of beam segments of the beam packet, wherein adjacent beam segments of the beam packet have traveled along optical path lengths when passing through the reshaping optical unit that differ from each other such that the beam packet is spatially incoherent;
   a homogenization optical unit disposed downstream from the reshaping optical unit, wherein the homogenization optical unit contributes to the conversion of the beam packet into the line-type output beam, and wherein different beam segments, of the multiplicity of beam segments of the beam packet, after passing through the homogenization optical unit, are mixed and superposed along the line direction; and
   a redirection optical unit disposed upstream from the reshaping optical unit, wherein the redirection optical unit is configured to redirect the at least one input laser beam into the reshaping optical unit through the input aperture in such a way that an incidence position or an incidence direction of the at least one input laser beam on the input aperture of the reshaping optical unit is changed in dependence on time, so that an angle distribution of the output beam is changed in dependence on time or an angle distribution of the beam packet emerging from the output aperture of the reshaping optical unit is changed in dependence of time.

2. The optical arrangement as claimed in claim 1, wherein the redirection optical unit is configured to change the incidence position or the incidence direction of the input laser beam on the input aperture in a periodic or non-periodic recurring movement pattern.

3. The optical arrangement as claimed in claim 1, wherein the redirection optical unit is configured to change the incidence position of the input laser beam along an input aperture longitudinal direction.

4. The optical arrangement as claimed in claim 3, wherein the redirection optical unit is configured to shift the incidence position of the input laser beam back and forth along the input aperture longitudinal direction.

5. The optical arrangement as claimed in claim 1, wherein the redirection optical unit is configured to change the incidence direction of the input laser beam such that a plane containing the incidence direction and an input aperture longitudinal direction is pivoted around the input aperture longitudinal direction.

6. The optical arrangement as claimed in claim 1, wherein the redirection optical unit comprises at least one mirror device, wherein the at least one mirror device comprises at least one shiftable or tiltable mirror.

7. The optical arrangement as claimed in claim 6, wherein the at least one mirror device comprises two mirrors which are shiftable or tiltable relative to one another.

8. The optical arrangement as claimed in claim 1, wherein the redirection optical unit comprises a lens system with a first lens and a second lens, wherein the second lens is shiftable or tiltable relative to the first lens.

9. The optical arrangement as claimed in claim 1, wherein the redirection optical unit comprises at least one optical element which is rotatably mounted.

10. The optical arrangement as claimed in claim 1, wherein the redirection optical unit is arranged on a first foundation, wherein the reshaping optical unit is arranged on a second foundation, and wherein the first foundation and the second foundation are arranged separately from each other.

11. The optical arrangement as claimed in claim 1, further comprising a Fourier lens arranged downstream of the homogenization optical unit in the beam path.

12. The optical arrangement as claimed in claim 1, wherein the input aperture of the reshaping optical unit is elongate and extends longitudinally along an input aperture longitudinal direction, wherein the output aperture is elongate and extends along an output aperture longitudinal direction, which differs from the input aperture longitudinal direction.

13. The optical arrangement as claimed in claim 12, wherein the reshaping optical unit is configured in such a way that a distance between adjacent beam segments of the beam packet is greater than an extent of the beam segments perpendicular to the output aperture longitudinal direction and perpendicular to the propagation direction.

14. The optical arrangement as claimed in claim 1, wherein the reshaping optical unit is formed from a monolithic, plate-type, transparent material, having a plate front side and a plate rear side extending substantially parallel thereto, wherein a region of the plate front side provides the input aperture and a region of the plate rear side provides the output aperture, wherein the reshaping optical unit is configured in such a way that, after input coupling through the input aperture, the beam segments of the input laser beam are guided by reflection at the plate front side and at the plate rear side to the output aperture.

15. The optical arrangement as claimed in claim 1, wherein the homogenization optical unit comprises at least one lens array which has a multiplicity of cylindrical lenses, and wherein the cylindrical lenses are geometrically dimensioned in such a way that the beam packet passes through a multiplicity of adjacent cylindrical lenses.

16. A laser system for generating the line-type output beam with an intensity distribution which has a line-type intensity profile in the beam cross section, the laser system comprising:
- at least one laser light source configured to output the at least one input laser beam; and
- the optical arrangement as claimed in claim 1 for converting the at least one input laser beam into the line-type output beam.

* * * * *